(12) United States Patent
Paura

(10) Patent No.: US 12,281,637 B2
(45) Date of Patent: Apr. 22, 2025

(54) SYSTEM COMPRISING A WIND TURBINE AND METHOD FOR OPERATING THE SYSTEM

(71) Applicant: General Electric Renovables Espana, S.L., Barcelona (ES)

(72) Inventor: Ingo Paura, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 44 days.

(21) Appl. No.: 18/015,587

(22) PCT Filed: Jul. 13, 2020

(86) PCT No.: PCT/EP2020/069798
§ 371 (c)(1),
(2) Date: Jan. 11, 2023

(87) PCT Pub. No.: WO2022/012739
PCT Pub. Date: Jan. 20, 2022

(65) Prior Publication Data
US 2023/0250802 A1    Aug. 10, 2023

(51) Int. Cl.
| | |
|---|---|
| *F03D 7/02* | (2006.01) |
| *G01V 1/01* | (2024.01) |
| *G01V 1/16* | (2006.01) |
| *G01V 1/28* | (2006.01) |

(52) U.S. Cl.
CPC ......... *F03D 7/0264* (2013.01); *F03D 7/0244* (2013.01); *G01V 1/01* (2024.01)

(58) Field of Classification Search
CPC ........ Y02E 10/72; G08B 21/10; G08B 27/00; F03D 7/0264; F03D 13/20; F03D 17/00;
(Continued)

(56) References Cited

U.S. PATENT DOCUMENTS

| | | | |
|---|---|---|---|
| 9,285,504 B2* | 3/2016 | Dannevik | ............... G01W 1/00 |
| 10,296,981 B2* | 5/2019 | Kaplan | .................. G06Q 40/08 |

(Continued)

FOREIGN PATENT DOCUMENTS

| | | |
|---|---|---|
| CN | 102289914 A | 12/2011 |
| CN | 103 460 073 A | 12/2013 |

(Continued)

OTHER PUBLICATIONS

Machine Translation of WO 2018070857 A1 [retrieved on Sep. 19, 2024]. Retrieved from: Espacenet. (Year: 2024).*

(Continued)

*Primary Examiner* — Eric J Zamora Alvarez
(74) *Attorney, Agent, or Firm* — Dority & Manning, P.A.

(57) ABSTRACT

A wind turbine system and to a method for operating said system is disclosed. The system further comprises a detection device configured for detecting body waves generated by an earthquake. In one aspect, the present disclosure is directed to a system comprising a wind turbine, in particular to an onshore erected wind turbine, a wind turbine controller for controlling the wind turbine, and at least one detection device, which is connected to the wind turbine controller for transmitting signals. The wind turbine includes at least a rotor having at least one rotor blade, wherein the rotor is rotatably mounted to rotation support means of the wind turbine, and a tower having a top end for supporting the rotation support means and a support end. The detection device is configured to detect and measure earthquake generated primary waves (P-waves). The detection device may include at least one sensor or a plurality of sensors, wherein the sender is configured to detect and/or measure earthquake generated P-waves. Such sensor may be further configured to detect an acceleration caused by the earthquake using a built-in accelerometer and then to calculate (Continued)

and output a synthetic acceleration, and to provide an estimated Japan Meteorological Agency seismic intensity scale (shindo scale) value.

12 Claims, 4 Drawing Sheets

(58) Field of Classification Search
CPC .... F03D 17/014; F03D 17/015; F03D 17/034; F03D 17/036; F03D 7/0268; F03D 80/50; F03D 7/0298; F03D 7/0296; F03D 7/0244; F03D 13/22; F03D 7/0288; F05B 2270/334; F05B 2260/90; F05B 2260/96; G01V 1/01; G01V 1/284; G01V 1/166; G01W 1/10
See application file for complete search history.

(56) References Cited

U.S. PATENT DOCUMENTS

| | | | | |
|---|---|---|---|---|
| 2003/0052777 A1* | 3/2003 | Bleier | ................. | G01V 3/12 73/170.27 |
| 2009/0303070 A1* | 12/2009 | Zhang | ................... | G08B 27/00 340/690 |
| 2011/0110769 A1* | 5/2011 | Stiesdal | ................ | F16C 35/062 29/889.1 |
| 2011/0138706 A1* | 6/2011 | Voss | ........................ | F03D 13/10 52/173.1 |
| 2011/0293418 A1 | 12/2011 | Baba | | |
| 2012/0280823 A1* | 11/2012 | Yang | ..................... | G08B 21/10 340/669 |
| 2014/0266762 A1* | 9/2014 | Warren | .................. | G08B 27/00 340/690 |
| 2022/0025862 A1* | 1/2022 | Wegmann | ............. | F03D 7/0296 |

FOREIGN PATENT DOCUMENTS

| | | | | |
|---|---|---|---|---|
| DE | 102018132413 A1 | 6/2020 | | |
| JP | 2013087767 A | 5/2013 | | |
| WO | WO2010083835 A2 | 7/2010 | | |
| WO | WO-2018070857 A1 * | 4/2018 | ............... | G01V 1/00 |

OTHER PUBLICATIONS

PCT International Search Report Corresponding PCT/EP2020/069798 on Jun. 4, 2024.
Chinese Office Action, Oct. 8, 2024.

* cited by examiner

SYSTEM COMPRISING A WIND TURBINE AND METHOD FOR OPERATING THE SYSTEM

RELATED APPLICATION

The present application claims priority to PCT Application Number PCT/EP2020/069798, filed on Jul. 13, 2020, which is incorporated by reference herein.

FIELD

The present subject matter relates generally to a system comprising a wind turbine and to a method for operating said system. In particular, the system further comprises a detection device configured for detecting body waves generated by an earthquake.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Generally, a wind turbine when erected onshore is mounted to ground support means, wherein moments and forces caused by mass and loads of the wind turbine are ducted into a surrounding ground of the wind turbine.

More specifically, forces acting from the ground towards the wind turbine are also transmitted via the ground support means. For example, earthquake generated movements of the surrounding ground of the wind turbine in connection with the mass and loads of the wind turbine result in a displacement of structures of the wind turbine with respect to the ground and therefore in additional forces and accelerations which need to be considered when designing components of the wind turbine.

BRIEF DESCRIPTION

Aspects and advantages of the invention will be set forth in part in the following description, or may be obvious from the description, or may be learned through practice of the invention.

In one aspect, the present disclosure is directed to a system comprising a wind turbine, in particular to an onshore erected wind turbine, a wind turbine controller for controlling the wind turbine, and at least one detection device, which is connected to the wind turbine controller for transmitting signals. The wind turbine includes at least a rotor having at least one rotor blade, wherein the rotor is rotatably mounted to rotation support means of the wind turbine, and a tower having a top end for supporting the rotation support means and a support end. The detection device is configured to detect and measure earthquake generated primary waves (P-waves), in particular, to measure motions and/or vibrations having a frequency of 0.00118 Hz to 500 Hz.

The detection device may include at least one sensor or a plurality of sensors, wherein the sensor is configured to detect and/or measure earthquake generated P-waves. Such sensor may be further configured to detect an acceleration caused by the earthquake using a built-in accelerometer and then to calculate and output a synthetic acceleration, and to provide an estimated Japan Meteorological Agency seismic intensity scale (shindo scale) value.

When an earthquake takes place, seismic waves in the form of body waves and surface waves are generated. The body waves may consist of a primary wave, the so-called P-wave, and a secondary wave (S-wave). P-waves are compressional and/or longitudinal waves which shake the ground in the direction of their propagation, wherein their speed is greater than all other waves i.e. 4 to 8 km/sec. In comparison, S-waves are shear waves which shake the ground perpendicularly to the direction of propagation having speed slower than P-waves.

According to an embodiment, the wind turbine can be a horizontal axis or vertical axis wind turbine. A horizontal axis wind turbine comprises a nacelle being about a vertical axis rotatably mounted to the top end of the tower. In this case, the rotation support means are embodied as an essentially horizontal bearing arrangement for supporting the rotor, in particular a main shaft of the rotor, on a mainframe of the nacelle. In case of an embodiment as vertical axis wind turbine, the rotation support means are embodied as a vertical bearing arrangement for allowing a rotation of the rotor about an essentially vertical rotation axis.

According to an embodiment, the system comprises ground support means, which are located on a ground of the wind turbine and are configured to support the support end, thus, to carry the weight and loads of the entire wind turbine.

The term "ground of the wind turbine" describes an area of the lithosphere supporting the wind turbine, wherein the area covers a circle around the wind turbine having a radius of not more than 10 km, in particular not more than 5 km, specifically not more than 1 km, preferably not more than 500 m, most preferably not more than 100 m. Furthermore, the ground includes the volume formed by the aforementioned and a depth of not more than 100 m, in particular not more than 50 m, preferably not more than 20 m.

Pursuant to a specific embodiment, the detection device is arranged on and/or in the ground of the wind turbine, for example in the surrounding of the wind turbine, in and/or on the ground support means, and/or is mounted to the support end of the tower. By this it is achieved to provide earthquake related data to the wind turbine controller, which is enabled by this measure to operate the wind turbine such that inacceptable loads can be prevented.

Pursuant to a specific embodiment, the support end is mounted to the ground support means by fixation means, in particular comprising at least one screw and at least one nut. Furthermore, the detection device is directly mounted to the fixation means, in particular to a screw or nut. This results in a very precise measurement which is also highly related to physical events happening at the specific connection area between the ground support means and the support end.

According to a further embodiment, the detection device is configured to determine an impact time of S-waves generated by the same earthquake causing the measured P-waves. In particular, in case of a detection of a plurality of P-waves the detection device is configured to distinguish if a plurality of earthquakes had happened, and therefore is configured to detect deduct a plurality of impact times of respective S-waves.

In another aspect, the present disclosure is directed to a method for operating the system according to any of the preceding embodiments, wherein the method is comprising the following steps:

measuring and/or detecting earthquake generated P-waves; suitable methods and devices are used for measuring and detecting the P-waves;

comparing a measurement of detected P-waves with a first threshold; the threshold can be predetermined, for example during designing the wind turbine and/or in the course of determining a load envelop of the wind turbine design of the wind turbine; in case the measurement exceeds the first threshold, an operational state of the wind turbine is altered in a safe mode or into a shutdown mode. In particular, the safe mode includes to operate the wind turbine with a reduced power output or without any output while remaining connected to the grid (idling operation). For example, the safe mode can include a first safe mode, wherein maximum 70% of rated power is generated and fed into the grid, or may include a second safe mode, wherein maximum 50% of rated power is generated and fed into the grid, or a third safe mode, wherein no power is generated (0% of rated power), however, the rotor remains rotating (idling) and the generator remains connected to the grid. In particular, the first safe mode may include a maximum power output of 60%, preferred of 50%, more preferred of 40% of rated power, and or more than 55%, preferred more than 45%, more preferred more than 35% of rated power. Optionally, the second safe mode may include a maximum power output of 40%, preferred of 30%, more preferred of 20% of rated power, and or more than 35%, preferred more than 25%, more preferred more than 15% of rated power.

By providing an embodiment of the proposed system and the related method it is achieved for the first time, to reduce loads and forces caused by an operation of a wind turbine before it gets struck by S-waves of an earthquake. This leads to the benefit of designing a wind turbine having an optimized safety margin, in particular because it can be prevented that negative effects of S-waves affecting structures of a wind turbine, while loads and forces of the wind turbine are elevated due to an elevated operational status. Thus, when considering maximum loads and/or forces the wind turbine is required to withstand, it is not necessary to add loads and/or forces caused by S-waves to operational loads and/or forces. In particular, the system and method provide the opportunity that S-waves caused loads and high or maximum operational loads do not affect the wind turbine at the same time, specifically, because operational loads are to be reduced before S-waves hit the wind turbine.

According to a further embodiment, the first reduced power output of the first safety mode is dependent on a magnitude of the measurement of a P-wave. For example, the reduction of power output increases (the overall power output decreases) with an increase of a measured value of the P-wave, preferably wherein the first reduced power output is determined by a function of the measurement. In particular, details of the measurement of the P-wave may indicate a strength, amplitude, direction and/or frequency of a subsequent S-wave. Therefore, in order to keep loads and/or forces affecting the wind turbine at a tolerable level, operational costs, wear, loads and forces can be reduced by activating the (first) safe mode if the measured P-wave indicates high loads and forces caused by the subsequent S-wave.

According to an embodiment is disclosed that the method may comprise the following additional steps:

determining a propagation direction of the detected P-waves; for example, the detection device is configured for measuring the P-wave at at least two, preferably three, locations at the ground, on/in the grant support means, and/or at the support end. Differences of said measurements may be used to determine the propagation direction, for example by analyzing a path difference of said measurements;

determining a sensitive direction range of the wind turbine; in particular, the term "sensitive direction range" reflects a range of directions, for example, wherein the range reflects the change of wind directions and/or azimuth positions of the nacelle within a predetermined period of time; surprisingly, it has been found out, that loads and/or forces applied to structures of the wind turbine in a first direction may be more critical then loads and forces applied to the wind turbine in another direction. Hence, the first direction is determined as being a sensitive direction. As a consequence, when it is determined by analyzing P-waves, that S-waves will struck the wind turbine from/according and/or in structural relevancy to the predetermined sensitive direction, the amount of power reduction of a safe mode, in particular of the first safe mode, is adjusted in order to keep overall loads and forces applied to the wind turbine to an acceptable limit.

For example, the reduction of power output according to a second safe mode may be higher than the reduction of power output according to a first safe mode, wherein the first safe mode is activated if the measurement of P-waves is above the first threshold, but the propagation direction of the P-waves is not relevant for the sensitive direction, and wherein the second safe mode is activated if also the propagation direction as determined is relevant to the sensitive direction.

Details as described may be at least partially summarized by the step of comparing the propagation direction with the sensitive direction range, and, if the propagation direction lies within the sensitive direction range and/or is relevant to the sensitive direction, and if the measurement exceeds the first threshold, this altering the operational state of the wind turbine into the second safe mode having a second reduced power output or into a shutdown mode, wherein the second reduced power output is smaller than the first reduced power output.

According to an additional or alternative embodiment, a step of conducting a load assessment of loads applied upon structures of the wind turbine including the measurement of detected P-waves and current and/or estimated operational loads of the wind turbine is performed. Furthermore, if the load assessment results in a definition of a critical load situation, an operational state of the wind turbine is altered into a safe mode having a reduced or no power output or into a shutdown mode.

According to a further embodiment, the method comprises a step of determining a determined load value of a component of the wind turbine. For example, the determined load value can be determined by conducting a load assessment, a load estimation, in particular a load simulation, of loads on/or forces acting on structures of the wind turbine at least based on current and/or estimated operational values of the wind turbine, in particular, firstly based on a power output, a measured and/or estimated wind speed and/or wind direction, a pitch angle of a pitch system of the wind turbine, and/or on a rotational speed of the rotor and/or of a power generator of the wind turbine, and secondly based on the measurement of detected P-waves. The determined load value represents combined load of loads caused by S-waves and of operational loads at the time when the S-waves hit the wind turbine.

According to a specific embodiment the method comprises the steps of comparing the determined load value with a load threshold, and, if the determined load value exceeds the load threshold, altering the operational state of the wind turbine into a safe mode having a reduced power output or into a shutdown mode.

According to a more specific embodiment, the method comprises steps of determining the reduced power output by conducting an estimation, in particular a simulation, at least based on the measurement of detected P-waves and on desired maximum loads to be applied upon structures of the wind turbine, on the reduced power output to be determined, on current and/or on estimated operational values of the wind turbine.

For example, said current and/or estimated operational value can be a measured and/or estimated wind speed and/or wind direction, a current or desired pitch angle of a pitch system of the wind turbine, and/or a current or desired rotational speed of the rotor and/or of a power generator of the wind turbine.

Furthermore it is disclosed, that a magnitude of the reduced power output is dependent on a magnitude of the determined load value, in particular wherein reduced power output decreases with an increase of the determined load value, preferably wherein the magnitude is a function of the estimation of loads or of the determined load value.

By performing at least one of the precedingly described steps, the safe mode for operating the wind turbine with reduced power output can be tailored to the current situation in means of operational loads and S-wave caused loads of the wind turbine. This may result in an increase power output while ensuring a load-optimized operation of the wind turbine.

Furthermore, —independently from the specific embodiments as described—the effect of the present disclosure is increased by conducting an additional step of determining an impact time of S-waves generated by the same earthquake causing the measured P-waves; and determining an altering time required for altering the operation of the wind turbine from a current operational state into a safe mode or shutdown mode with and/or without performing active breaking measures, and, if the impact time is shorter than the altering time, applying active braking measures to the rotor.

Specifically, the preceding embodiment may include that breaking measures are embodied as a direct or indirect step of reducing a rotational speed and/or a moment of the rotor. For example, engaging a friction brake in a drivetrain of the rotor of the wind turbine may be understood as a step of direct reduction, wherein pitching rotor blades towards a position causing a reduced energy extraction from wind hitting the rotor may be understood as an indirect breaking measures.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

Even though that specific embodiments have been described in the foregoing, a combination of portions of said embodiments is disclosed, too, wherein, for example, a step of simulating the determined load value may also be used when operating the wind turbine according to a plurality of thresholds for the measured S-waves in connection with a definition and consideration of a sensitive direction.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Figure 1:
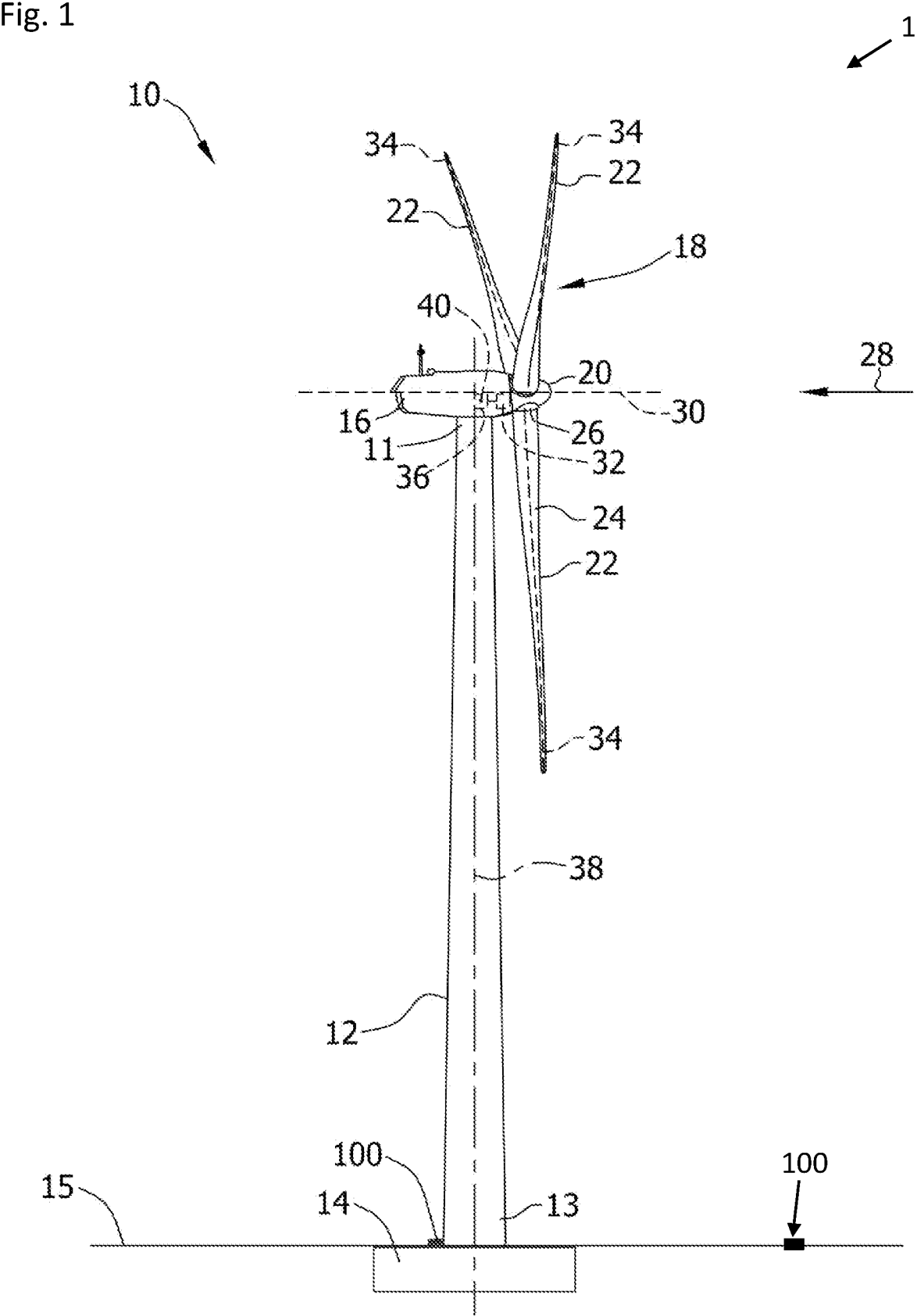
FIG. 1 illustrates a perspective view of one embodiment of a system comprising a wind turbine and a detection device according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine.

In the exemplary embodiment, the wind turbine 10 includes a tower 12 that extends from ground support means 14, a nacelle 16 mounted on tower 12, and a rotor 18 that is coupled to nacelle 16. The rotor 18 includes a rotatable hub 20 and at least one rotor blade 22 coupled to and extending outward from the hub 20. In the exemplary embodiment, the rotor 18 has three rotor blades 22. In an alternative embodiment, the rotor 18 includes more or less than three rotor blades 22.

In the exemplary embodiment, the tower 12 comprises a top end 11 and a support end 13, wherein the tower 12 is supported by the ground support means 14 via the support end 13, and wherein the tower 12 carries the nacelle 16 via the top end 11.

The tower 12 can be fabricated from tubular steel to define a cavity (not shown in FIG. 1) between ground support means 14 and the nacelle 16. In an alternative embodiment, the tower 12 is any suitable type of a tower having any suitable height.

The ground support means 14 are arranged in a ground 15 surrounding the wind turbine 10, wherein the ground 15 can be considered as being an area of the lithosphere supporting the wind turbine 10. According to a specific embodiment, the ground support means 14 are embodied as foundation for example made of concrete while comprising anchor screws.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In one embodiment, the rotor blades 22 have a length ranging from about 15 meters (m) to about 100 m. Alternatively, rotor blades 22 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines a perspective of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may change a pitch angle of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed and/or facilitates a stall of the rotor 18.

In the exemplary embodiment, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the exemplary embodiment, as the wind direction 28 changes, a yaw direction of the nacelle 16 may be rotated about a yaw axis 38 to position the rotor blades 22 with respect to wind direction 28.

In the exemplary embodiment, the wind turbine controller 36 is shown as being centralized within the nacelle 16, however, the wind turbine controller 36 may be a distributed system throughout the wind turbine 10, on the ground support means 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
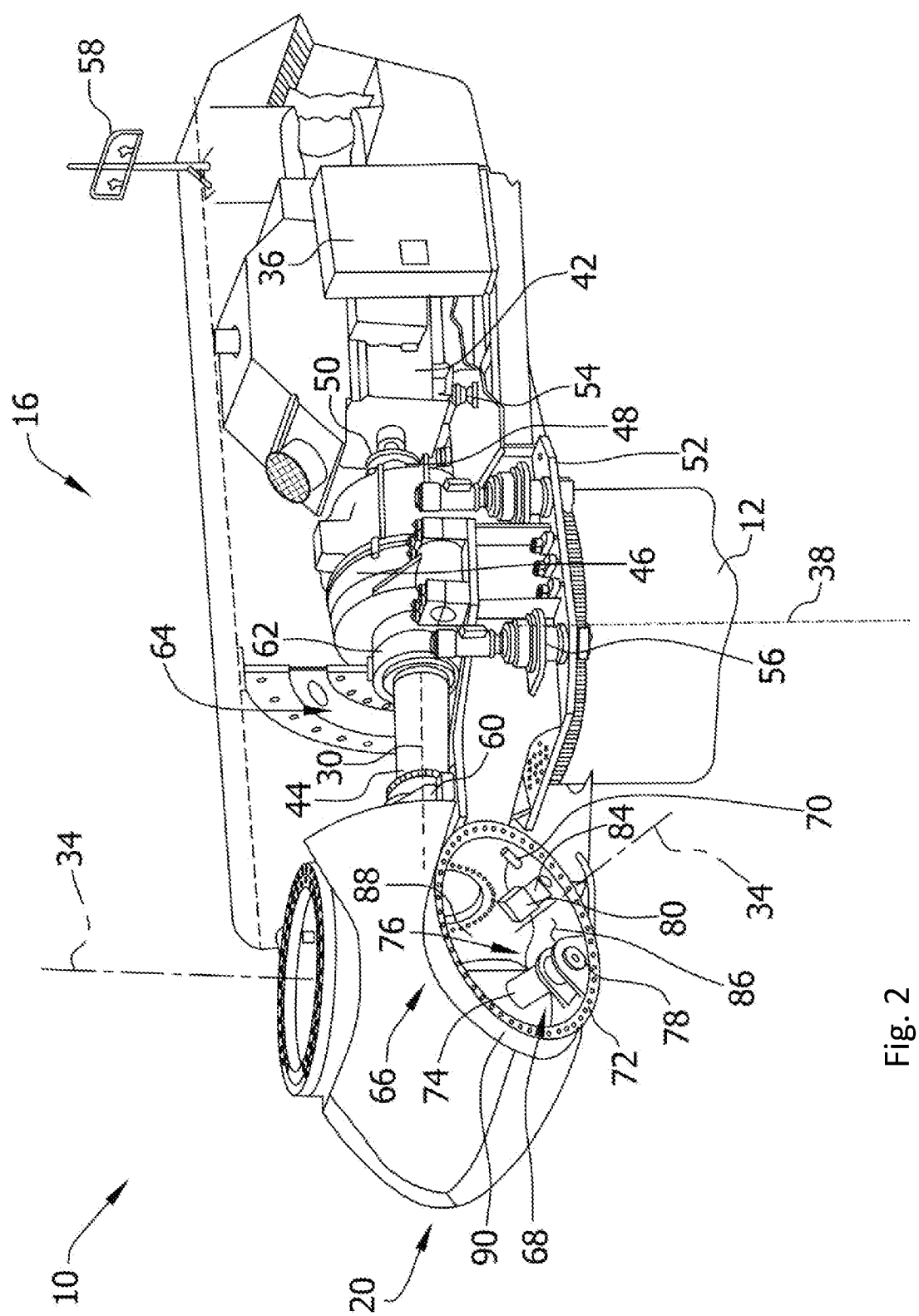
FIG. 2 illustrates a simplified, internal view of one embodiment of a nacelle of the wind turbine according to the present disclosure.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

The gearbox 46 and generator 42 may be supported by a main support structure frame of the nacelle 16, optionally embodied as a main frame 52. The gearbox 45 may include a gearbox housing 102 that is connected to the main frame 52 by one or more torque arms 47. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 12 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

However, the present disclosure is not limited to a wind turbine comprising a gearbox, but also wind turbines without a gearbox, thus, heading a so-called direct drive may be concerned as well.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 22.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 22 to a feathered position for reducing a rotational speed of the rotor 18.

According to an embodiment, a power generator 84, for example comprising a battery and/or electric capacitors, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface 90 of hub 20 and may be coupled, directly or indirectly, to outer surface 90.

According to the embodiment as shown in FIG. 1, a system 1 comprises the wind turbine 10, a detection device 100 configured to detect and measure earthquake generated primary waves (P-waves), and a turbine controller. The turbine controller may be the same device as the wind turbine controller 36 or may be incorporated in said wind turbine controller 36. The turbine controller of the system 1 may also be located at a different location than the wind turbine 10 and the wind turbine controller 36, wherein said controller is to be connected for communication of signals and control instructions.

Specifically, but not limited to it, the detection device 100 is arranged in a transition area between the ground support means 14 and the support end 13. In particular, the detection device 100 may be mounted to connection means configured for attaching the support end 13 to the ground support means 14. For example, said connection means may be embodied as a screw being anchored within the ground support means 14, wherein the support end 13 is configured for receiving a portion of an anchoring screw such, that the support end 13 may be attached to the ground support means 14 in a pre-tensioned manner.

According to an additional or alternative embodiment, the detection device 100 may fixed to the ground 15 while establishing a distance to the tower 12.

Furthermore, according to an additional or alternative embodiment, the detection device 100 may include a plurality of sensors configured to detect and/or measure earthquake generated P-waves, in particular to measure motions and/or with frequencies from 500 Hz to 0.00118 Hz. In particular at least one sensor, preferably at least two sensors, is/are attached to the ground support means 14 and/or at least one sensor is attached to the support end 13.

Optionally, at least a further sensor configured to detect and/or measure earthquake generated P-waves is arranged to the ground 15, and thereby having a certain distance to the ground support means 14. Such distance is larger than 10 m, preferably larger than 100 m, in particular larger than 1000 m, and/or wherein such distance does not exceed 2000 m, preferably 200 m, in particular does not exceed 20.

Figure 3:
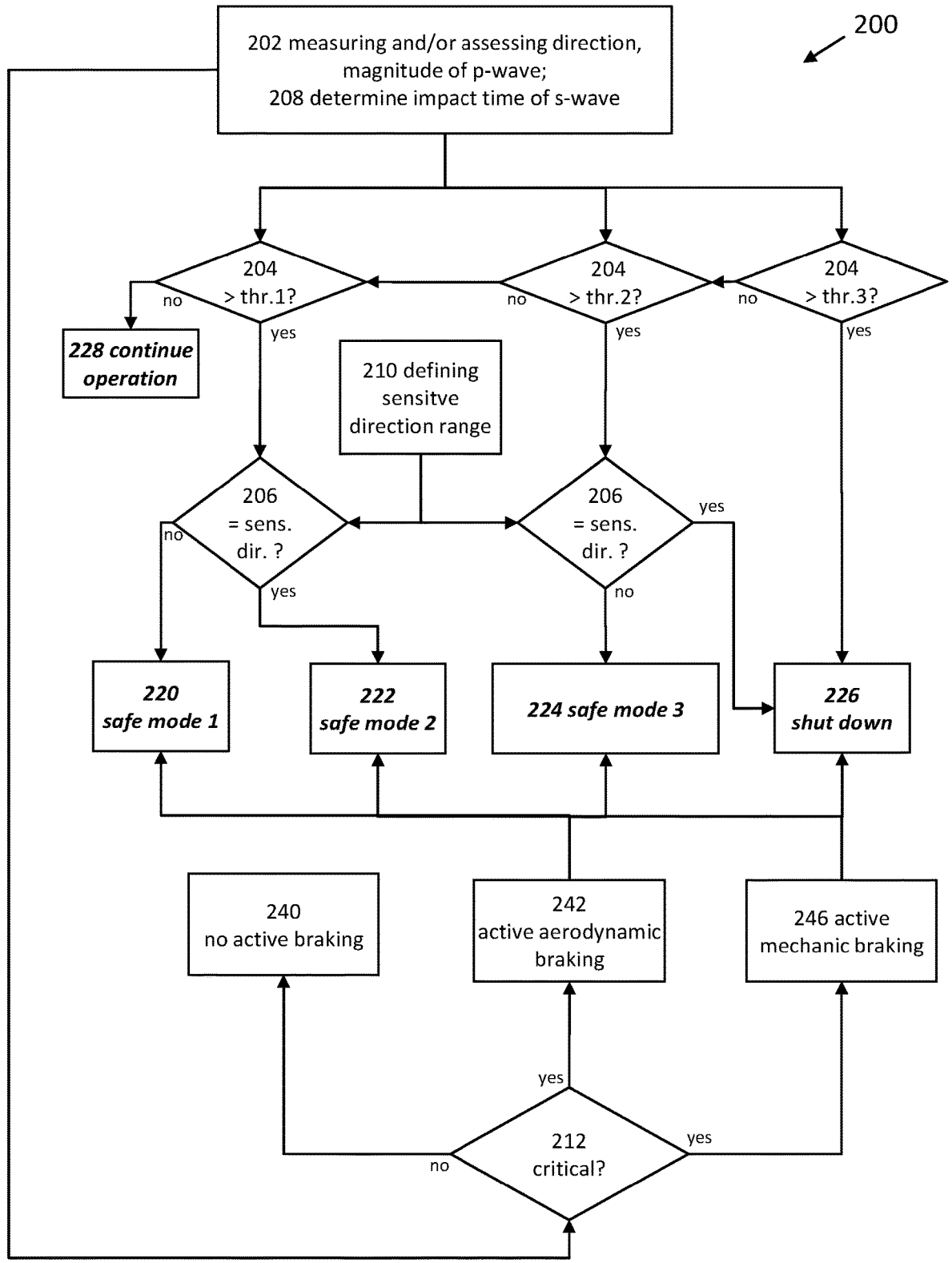
FIG. 3 represents a schematic flowchart of a method for operating the system according to a first embodiment.
Figure 4:
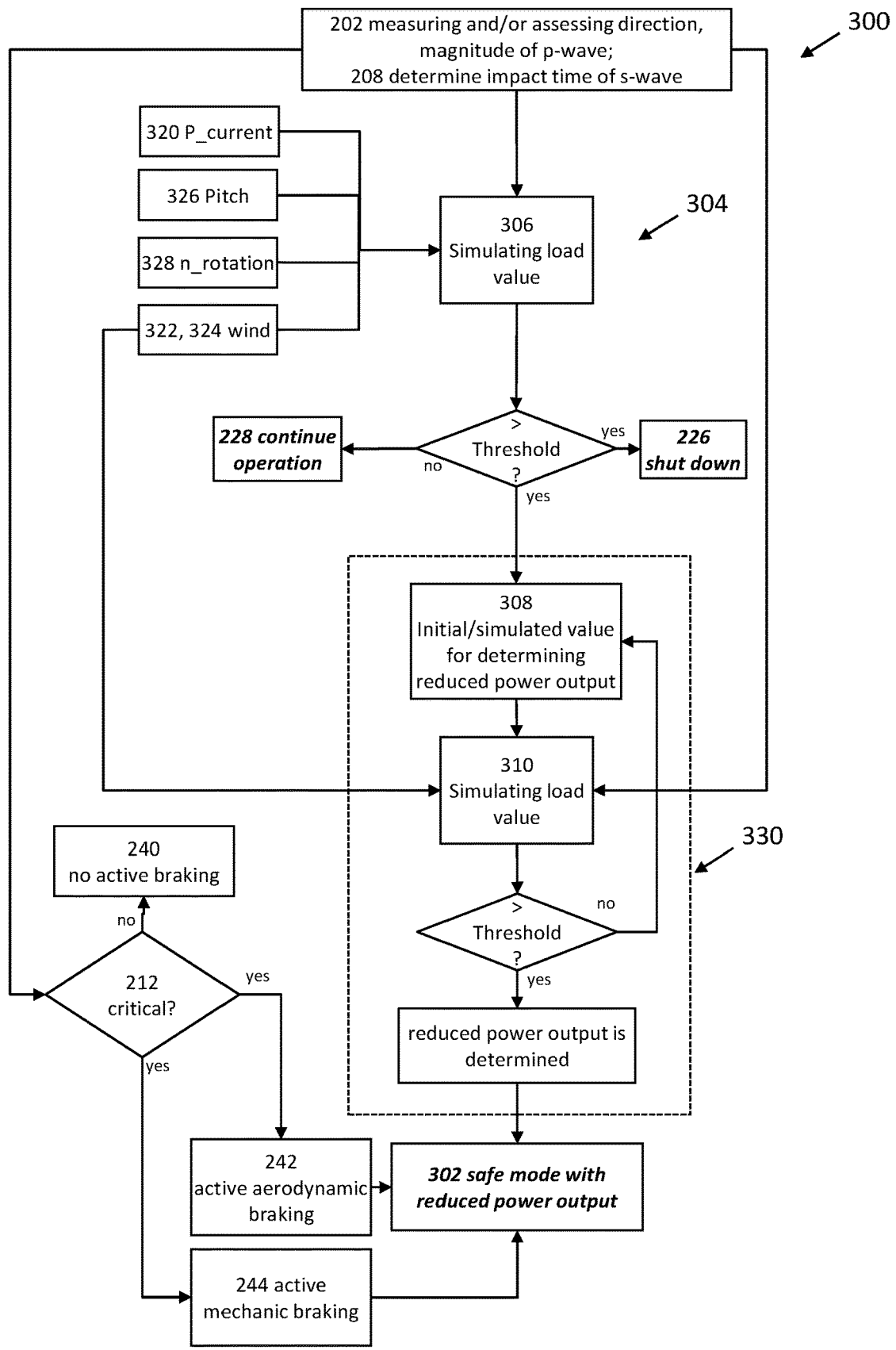
FIG. 4 shows a schematic flowchart of a method for operating the system according to second embodiment.

FIG. 3 and FIG. 4 schematically disclose embodiments of the present disclosure, specifically of a respective method 200, 300 for operating the system 1 and/or the wind turbine 10. However, the disclosure is not limited to certain specific embodiments, in particular, each of the embodiments may also comprise steps of the respective other embodiment, for example, the method 300 of FIG. 4 may also comprise the step of defining a sensitive direction range 210 according to method 200 of FIG. 3.

Both methods 200 (FIG. 3) and 300 (FIG. 4) comprise an initial step of detecting a so-called primary wave (P-wave) generated by an earthquake and transmitted via the ground from the earthquake's epicenter to the location of the detection device 100 and/or to the location of the wind turbine 10. Consequently, the detection device 100, or a sensor or a plurality of sensors of the detection device 100 measure 202 at least a magnitude or the magnitude and a direction of the P-wave.

It is optionally included, that an interpretation of measured signals—for example specifying the magnitude and/or direction of the P-wave—is either conducted by the detection device 100 itself, for example by including a detection controller into the detection device 100 configured for elaborating on measured data, or is performed by a turbine controller, specifically by the wind turbine controller 36.

A further step comprises determining 208 an impact time of an S-wave related to the detected P-wave at the wind turbine 10 and/or at the ground support means 14. This determination 208 may comprise analyzing at least one of the following: frequency, wavelength, propagation speed of the P-wave, soil characteristics of the ground 15 or of a ground arranged between the epicenter and the ground support means 14, external data sources, for example earthquake warning data from specialized data providers, and/or data obtained from tests and general experience. Specifically, data describing a relation of a propagation speed of the P-wave with respect to the S-wave in the specific geographical area may be considered in order to determine 208 the impact time of the S-wave of the related earthquake. Alternatively or in addition, the determining 208 the impact time may comprise the step of simulating an earthquake and/or a related propagation of S-waves and P-waves.

Referring to the method 200 a measurement of the detected P-wave is compared 204 with a first threshold. For example, a magnitude of the P-wave is analyzed and compared 204 with a threshold for a magnitude for a P-wave, wherein a magnitude of a P-wave is related to a magnitude of a subsequent S-wave to be expected to hit the wind turbine 10.

Hence, according to an embodiment, the detection device 100, the turbine controller or the wind turbine controller 36 may comprise threshold data representing a critical magnitude of a P-wave. The first threshold may be determined such, that—when knowing a relation of a magnitude of an S-wave with respect to a magnitude of a preceding P-wave—the first threshold for the P-wave represents a certain quantity and/or quality of a related S-wave, which would create a critical load situation for the wind turbine. A critical load situation may be a situation wherein loads exceed—also temporarily—an acceptable level.

According to an embodiment, the step of comparing 204 the measurement with a first threshold may include that the measurement of step 202 is further analyzed and said analyzing result is compared with the first threshold. For example, the measurement of the P-wave may be interpreted and transferred into an additional load value, wherein said load value would represent a load situation of a component of the wind turbine hit by the expected S-wave. Said load value is compared with a first threshold, wherein the first threshold is a first load threshold. This specific embodiment of step 204 may be analogue two steps 306 and subsequent comparison of methods 300 (FIG. 4).

Generally spoken, the step of comparing 204 may also be understood as a step of determining a magnitude, frequency, and/or load-related consequences of an S-wave following the detected P-wave with respect to structures of the wind turbine. Hence, the first threshold may be determined accordingly, in fact, that the first threshold may be a magnitude/frequency of the measured P-wave, and/or an assumed magnitude/frequency of a related S-wave, and/or a specific maximum load generated by the related S-wave.

If the result of comparing 204 measured, deducted and/or assumed data with the first threshold results in a negative decision, an operation of the wind turbine 10 is continued 228 without altering the operational status as a response on the detected P-wave.

If the comparison 204 results in that aforementioned data exceeds the first threshold, a result of an analysis/defining 210 of sensitive directions may be taken to into account. Said analysis of directions may comprise defining 210 a sensitive direction range of the wind turbine 10. A sensitive direction range may comprise a direction or a range of directions, thus, an angular area. When the wind turbine 10 is hit by an S-wave propagating from a direction within the sensitive direction range, earthquake generated load-related effects on any structure of the wind turbine 10 are more critical than the wind turbine 10 would be hit by the same S-wave coming from a direction not within the sensitive direction range.

Therefore, according to a direction assessment and comparison step 206, a propagation direction of the P-wave and/or of the expected S-wave is determined including a determination, for example by comparing 206, if the determined propagation direction is within the sensitive direction range.

If the step of assessment and comparison 206 results in a negative assessment—thus, the determined propagation direction is not within the sensitive direction range—, the operation of the wind turbine 10 is altered into a first safe mode 220.

For example, the first safe mode 220 may include to operate the wind turbine 10 with a first amount of reduced power output, in particular that a maximum power output of the wind turbine 10 is limited to 70% of rated power.

However, in case the direction assessment and comparison 206 comes up with a positive result—the determined propagation direction is within the sensitive direction range—, a second safe mode 222 of the wind turbine 10 is activated. For example, the second safe mode 222 may include to operate the wind turbine 10 with a second amount of a reduced power, in particular, that a maximum power output of the wind turbine 10 is limited to 50% of rated power. This reflects the fact, that the S-wave striking the wind turbine 10 from a direction within the sensitive direction range has an elevated critical load-related effect on the wind turbine 10. Thus, operational loads are further reduced by reducing the maximum power output of the wind turbine 10.

When stepping back to the step of comparing 204 the results of the measurement 202 with a threshold, it is disclosed according to an embodiment, that a second threshold is determined and used for comparing 204. The second threshold for the step of comparing 204 is higher than the first threshold.

If the second threshold is exceeded, a result of an assessment and comparison 206 of a propagation direction being within a range of sensitive directions can be taken into account analogously as previously described.

In fact, according to an embodiment, the step of understanding and comparing 206 of directions may also take place in the course of measuring 202 of P-waves or in the course of another suitable activity.

If the step of comparing 206 of directions results in a negative outcome, the wind turbine 10 may be operated in in additional safe mode and/or in the second safe mode 222. In the latter case, the accumulated load situation of the wind turbine 10—when the second threshold is exceeded but the directions are not critical—is comparable to a situation as described above, wherein only the first threshold is exceeded but the step 206 of direction results in a positive outcome.

In addition, if the second threshold is exceeded in comparison step 204 and the direction comparison 206 has a positive outcome, a third safe mode 224 may be activated. In particular, the third safe mode 224 may have a further reduced power output, for example, that the maximum power output is limited to 30%, preferably to 20%, and particularly to 10%, more specifically to 0% of rated power. If power output is reduced to 0%, the generator 46 of the wind turbine 10 may still be connected to the grid and/or the rotor 18 of the wind turbine 10 may be idling (rotating without extracting excess energy from the wind but for maintaining rotation). A reduction to 0% and remaining connected to the grid comes with the benefit to be able to resume energy generation and supply into the grid with immediate effect.

According to an embodiment, the comparison step 204 may comprise a third threshold, wherein exceeding such threshold results in a shutdown mode 226 of the wind turbine 10. That means, an expected S-wave—according to the analysis 202 of the P-wave, will have such critical effect on loads of the wind turbine 10, that any power generation related load shall be reduced or diminished in order to have an increased safety margin when the expected S-wave will strike the wind turbine 10.

Summarizing, according to the method 200 as depicted in FIG. 3, measurements and/or analysis 202 of a detected P-wave may be compared with a first, a second and/or a third threshold, which would result to alter the operation of the wind turbine 10 into the first safe mode 220, into the second safe mode 222 or into a shutdown mode 226.

Optionally, the propagation direction of the P-wave—and therefore also of the S-wave—may be analyzed and or is compared 206 with respect to a determined 210 range of sensitive directions. If the step 206 results in a positive outcome, the wind turbine 10 is operated in the second mode 222 instead of the first mode 220, respectively is operated in the third safe mode 224 instead of the second safe mode 222.

Alternatively or additionally, the impact time of the expected S-wave—as determined in a step 208—may be used for a dynamics assessment step 212. This step 212 comprises two analyze if a change of an operational status from normal operation into the first safe mode 202, the second safe mode 222, the third safe mode 224 and/or into the shutdown mode 226 requires a time period larger than the remaining time until the expected impact of the expected S-wave. If this assessment is positive, thus, the S-wave is expected to strike with the wind turbine 10 earlier than a safe mode can be established and take effect of reducing loads, additional breaking measures for reducing the moment and/or rotational speed of the rotor 18 are performed.

For example, if sufficient time remains before impact, no active braking 240 may be executed, hence, mechanical and/or frictional losses of the drivetrain 64 and/or rotor 18 are braking the rotor 18. If time is critical, wind turbine blades 22 can be pitched such that an aerodynamic braking effect is achieved, and/or a step of mechanical braking 246, for example by applying a friction brake of the drivetrain 64, can be conducted. By realizing one or a plurality of said breaking measures the transition time of altering the operational state of the wind turbine 10 can be shortened.

According to FIG. 4 the method 300 includes a measuring/assessment step 202 of detected P-waves and/or a determination 208 of an impact time.

Subsequently, a step of conducting a load assessment 304 of the present and an upcoming load situation of wind turbine 10 is conducted. For example, said load assessment 304 may include a step of simulating 306 of relevant load values of components of the wind turbine 10. The step of load assessment 304 may include at least a measurement and/or interpretation of said measurement of the step of measuring 202 of the P-wave and at least one of the following data: current and/or estimated power output 320, current and/or estimated wind speed 222, current and/or estimated wind direction 223, current and/or estimated pitch angle of a rotor blade 22, current and/or estimated rotational speed or torque of the rotor 18 or of the generator 46.

If the load assessment results in a value not exceeding a predetermined threshold for a load value, the wind turbine 10 remains in continued operation 228. However, if a first load-threshold is exceeded, the wind turbine is put into a load safe mode 302 having a reduced power output.

In particular, the amount of power reduction is determined by an iterative adjustment step 330, wherein a step 308 of simulating and/or estimating a simulated load value 310 of a component of the wind turbine 10 is performed. In said step 330, a first theoretical power reduction is assumed and used for estimating the simulated load value 310. If the value 310 exceeds a threshold a new, thus, further reduced theoretical power reduction is assumed and another similarly load value 310 is determined. This process is repeated until the threshold is not exceeded any more, and thereby an amount of power reduction for the safe mode 302 is determined.

The step 310 includes at least a measurement and/or interpretation of said measurement of the step of measuring 202 of the P-wave and at least one of the following data: current and/or estimated power output 320, current and/or estimated wind speed 222, current and/or estimated wind direction 223, current and/or estimated pitch angle of a rotor blade 22, current and/or estimated rotational speed or torque of the rotor 18 or of the generator 46.

Analogously to method 200, in particular to step 212, breaking measures can be applied if step 208 of determining an impact time results in a critical timely situation.

The present invention is not limited to the above-described embodiments and modifications and may be embodied in various forms within the gist thereof, for example, the technical features of the embodiments and modifications corresponding to the technical features according to the aspects described in the Summary of the Invention section may be replaced or combined as appropriate to solve some or all of the above-described problems or obtain some or all of the above-described effects, for example wherein a step of simulating a load value 310 and/or the subsequent step 330 of the method 300 may also be applied in the method 200, for example for specifying an amount of load reduction of the first safe mode 220, of the second safe mode 222, and/or of the third safe mode 224.

REFERENCE NUMBERS 1 system
10 wind turbine
11 top end
12 tower
13 support end
14 ground support means
15 ground
16 nacelle
18 rotor
20 rotatable hub
22 rotor blades
24 blade root portion
26 load transfer regions
28 wind direction
30 axis of rotation
32 pitch system
34 pitch axes
36 wind turbine controller
38 yaw axis
40 processor
42 electric generator
44 main shaft 46 gearbox
47 torque arm
48 high speed shaft
50 coupling
52 main frame
54 decoupling support means
56 yaw drive mechanism
58 meteorological mast
60 forward support bearing
62 aft support bearing
64 drive train
66 pitch assembly
68 pitch drive system
70 sensor
72 pitch bearing
74 pitch drive motor
76 pitch drive gearbox
78 pitch drive pinion
80 pitch control system
84 power generator
86 cavity
88 inner surface
90 outer surface
100 detection device
200 method
202 measuring
204 determine propagation direction
206 comparing
208 determine impact time
210 determine sensitive direction range
212 dynamics assessment step
220 first safe mode
222 second safe mode
224 third safe mode
226 shutdown mode
228 continue operation
240 no active braking
242 active aerodynamic braking
244 mechanical braking
300 method
302 safe mode
304 conducting a load assessment
306 determining load value
308 determining a reduced power output
320 current power output
322 wind speed
324 wind direction
326 pitch angle
328 rotational speed
330 iterative adjustment step

The invention claimed is:

1. A method for operating a wind turbine system, the wind turbine system including:
   a wind turbine having a rotor with at least one rotor blade, rotation support means for rotatably supporting the rotor, and a tower having a top end that supports the rotation support means and an opposite support end;
   a wind turbine controller configured to control operation of the wind turbine; and
   a detection device in communication with the wind turbine controller for signal transmission therewith, the detection device configured to detect and measure earthquake generated P-waves from ground motions or vibrations;
   the method comprising:
   measuring earthquake generated P-waves;
   comparing a measurement of detected P-waves with a first threshold;
   when the measurement exceeds the first threshold, altering an operational state of the wind turbine into a first safe mode having a first reduced power output or into a shutdown mode;
   determining an impact time of S-waves generated by a same earthquake generating the P-waves;
   determining an altering time required for altering the operation of the wind turbine from the operational state into the first safe mode or the shutdown mode without performing active breaking measures; and
   applying active braking measures to the rotor when the impact time is shorter than the altering time.

2. The method according to claim 1, wherein the first reduced power output is dependent on a magnitude of the measurement such that the first reduced power output decreases with an increase of the measurement.

3. The method according to claim 1, further comprising:
   conducting a load assessment of loads applied upon structures of the wind turbine; and
   when the load assessment indicates a critical load situation, altering the operational state of the wind turbine into a load safe mode having a reduced power output or into the shutdown mode.

4. The method according to claim 3, wherein the load assessment comprises an estimation of load values applied upon structures of the wind turbine based on current or estimated operation values of the wind turbine, the operation values including any one or combination of: a power output of the wind turbine; a measured or estimated wind speed; a measured or estimated wind direction; a pitch angle of a pitch system of the wind turbine; a rotational speed of the rotor; a rotational speed of a power generator of the wind turbine; or the measurement of detected P-waves.

5. The method according to claim 4, further comprising:
   comparing the estimated load values with a load threshold; and when the estimated load values exceed the load threshold, altering the operational state of the wind turbine into the load safe mode having the reduced power output or into the shutdown mode.

6. The method according to claim 5, further comprising:
   determining the reduced power output by conducting an estimation based on one or a combination of: a desired maximum load to be applied upon the structures of the wind turbine; or the current or estimated operation values of the wind turbine.

7. The method according to claim 4, wherein a magnitude of the reduced power output is dependent on a magnitude of the estimated load values such that the reduced power output decreases with an increase of the estimated load values.

8. The method according to claim 1, wherein the detection device is arranged at: on or in ground adjacent the tower; or in in the support end of the tower, or on or in ground support means on which the support end of the tower is mounted.

9. The method according to claim 8, wherein the support end of the tower is mounted to the ground support means by fixation devices, the detection device directly mounted to the fixation devices.

10. The method according to claim 8, wherein the detection device is configured to determine a propagation direction of the detected P-waves.

11. The method according to claim 1, wherein the rotation support means comprise a nacelle, the rotor rotatably supported by the nacelle along an essentially horizontal axis of rotation, and the nacelle rotatably mounted about a yaw axis of the wind turbine on the top end of the tower.

12. A method for operating a wind turbine system, the wind turbine system including:
- a wind turbine having a rotor with at least one rotor blade, rotation support means for rotatably supporting the rotor, and a tower having a top end that supports the rotation support means and an opposite support end;
- a wind turbine controller configured to control operation of the wind turbine; and
- a detection device in communication with the wind turbine controller for signal transmission therewith, the detection device configured to detect and measure earthquake generated P-waves from ground motions or vibrations with frequencies from 500 Hz to 0.00118 Hz;

the method comprising:
- measuring earthquake generated P-waves;
- comparing a measurement of detected P-waves with a first threshold; and
- when the measurement exceeds the first threshold, altering an operational state of the wind turbine into a first safe mode having a first reduced power output or into a shutdown mode;

the method further comprising:
- determining a propagation direction of the detected P-waves;
- determining a sensitive direction range of the wind turbine;
- comparing the propagation direction with the sensitive direction range;
- when the propagation direction lies within the sensitive direction range and the measurement exceeds the first threshold, altering the operational state of the wind turbine into a second safe mode having a second reduced power output that is smaller than the first reduced power output or into the shutdown mode.

* * * * *